United States Patent [19]
Tibbs
[11] 3,956,894
[45] May 18, 1976

[54] AIR-STEAM-VAPOR EXPANSION ENGINE

[76] Inventor: Robert C. Tibbs, Hospital Drive, Cleveland, Miss. 38732

[22] Filed: July 17, 1973
[21] Appl. No.: 379,957

[52] U.S. Cl. .................................... 60/508; 60/513; 60/682; 60/715
[51] Int. Cl.[2] .................................... F03G 7/06
[58] Field of Search ............................ 60/508–515

[56] References Cited

UNITED STATES PATENTS

| | | | |
|---|---|---|---|
| 695,206 | 3/1902 | Griesche | 60/513 |
| 745,805 | 12/1903 | Ennis | 60/59 T |
| 883,866 | 4/1908 | Dean | 60/514 |
| 1,008,532 | 11/1911 | Curtis et al. | 60/21 |
| 1,008,851 | 11/1911 | Morison | 60/21 |
| 2,836,033 | 5/1958 | Marrison | 60/516 |
| 2,867,975 | 1/1959 | Mallory | 60/514 |

FOREIGN PATENTS OR APPLICATIONS

| | | | |
|---|---|---|---|
| 610,255 | 9/1926 | France | 60/511 |
| 614,979 | 12/1926 | France | 60/508 |
| 656,170 | 1/1938 | Germany | 60/513 |

*Primary Examiner*—Martin P. Schwadron
*Assistant Examiner*—H. Burks, Sr.
*Attorney, Agent, or Firm*—Clarence A. O'Brien; Harvey B. Sullivan

[57] ABSTRACT

An expansion chamber is provided and heated heat exchange surfaces are disposed in the expansion chamber. An expandable fluid supply is provided together with structure for selectively admitting the expandable fluid into the chamber in good heat exchange relation with the heat exchange surfaces. Further, energy conversion structure is provided and communicated with the expansion chamber and operable to convert the energy of the fluid expanded in the chamber into mechanical energy.

9 Claims, 3 Drawing Figures

AIR-STEAM-VAPOR EXPANSION ENGINE

Figure 1:
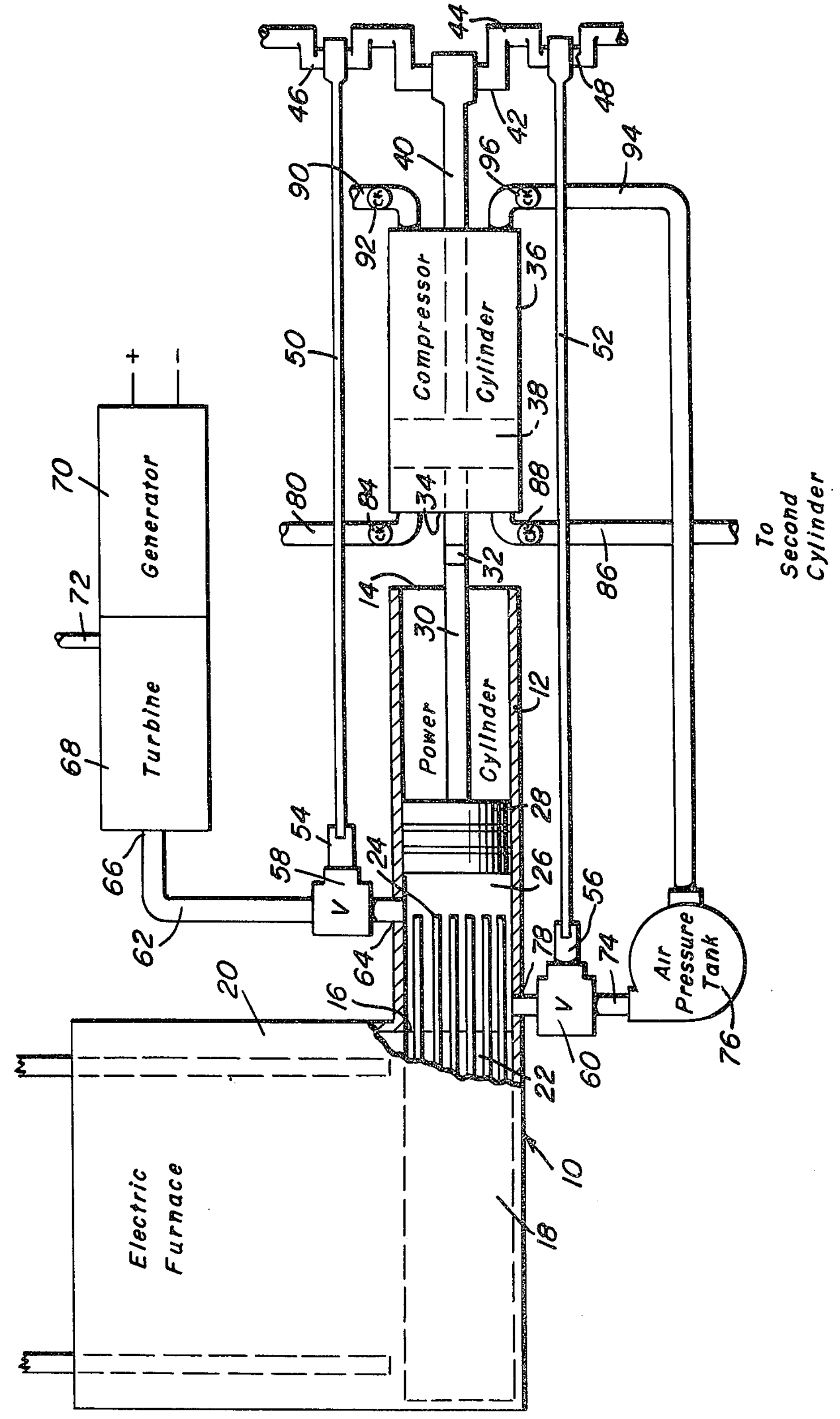

The expansion engine of the instant invention has been specifically designed to provide an efficient source of power. The engine utilizes a heat source in the form of an electric furnace and the energy conversion structure from which mechanical energy is derived from the initial expansion of fluid in the expansion chamber includes a secondary energy conversion section or structure wherein the expanded fluid exhausted from the primary section of the energy conversion structure may be converted to mechanical energy for driving a generator to supply at least some of the electrical energy requirement of the electric furnace.

The electrical source providing energy to the electric furnace and heat storage system comprises an outside source of electrical energy. The heat storage system (electrical furnace and surrounding heat storage material) is charged by high voltage current and the electric furnace provides an insulated stored energy source for the expansion engine in an automobile.

A first form of the expansion engine utilizes air as the expandable fluid and discharges the exhaust from the second section of the energy conversion structure directly into the ambient atmosphere.

A second form of the expansion engine utilizes a closed circuit for the fluid to be expanded and that fluid may comprise water or other liquids which may be vaporized such as a refrigerant. The second form utilizes a condenser for condensing the exhaust from the expansion engine back into a liquid and the condensed liquid returns by gravity to an injector driven by the rotatably output shaft of the engine for injecting the liquid to be expanded into the expansion chamber.

A third form of the invention is also disclosed and includes a closed circuit. The third form of the invention is substantially similar to the second form of the invention, except that the third form will be used primarily with gases to be expanded in the expansion chamber and utilizes a pump driven from the energy conversion structure in order to pump the gas, after being cooled in the condenser, into a storage tank for subsequent injection into the expansion chamber.

One main object of this invention is to provide a fluid expansion engine which will be capable of efficient operation.

Another main object of this invention, although not limited to this purpose, is to provide, for the propulsion of automobiles, a totally pollution free engine.

Another object of this invention is to provide an expansion engine whose basic structure will enable it to be utilized both in conjunction with liquid as an expandable fluid as well as gas as an expandable fluid.

The engine is utilized to drive a generator and a further primary object is to use the electrical energy generated directly, or indirectly through batteries, to drive electric motors used as secondary means of propulsion for automobiles.

A final object of this invention to be specifically enumerated herein is to provide a fluid expansion engine in accordance with the preceding objects which will conform to conventional forms of manufacture, be of simple construction and easy to use so as to provide a device that will be economically feasible, long lasting and relatively trouble free in operation.

Figure 2:
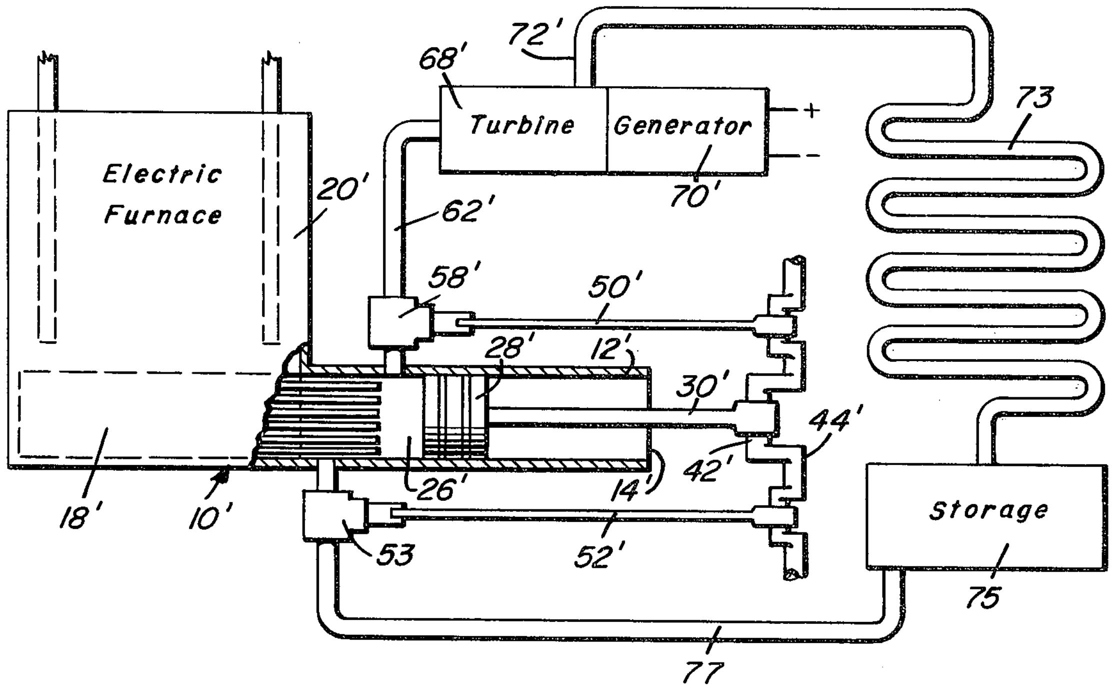
Figure 3:
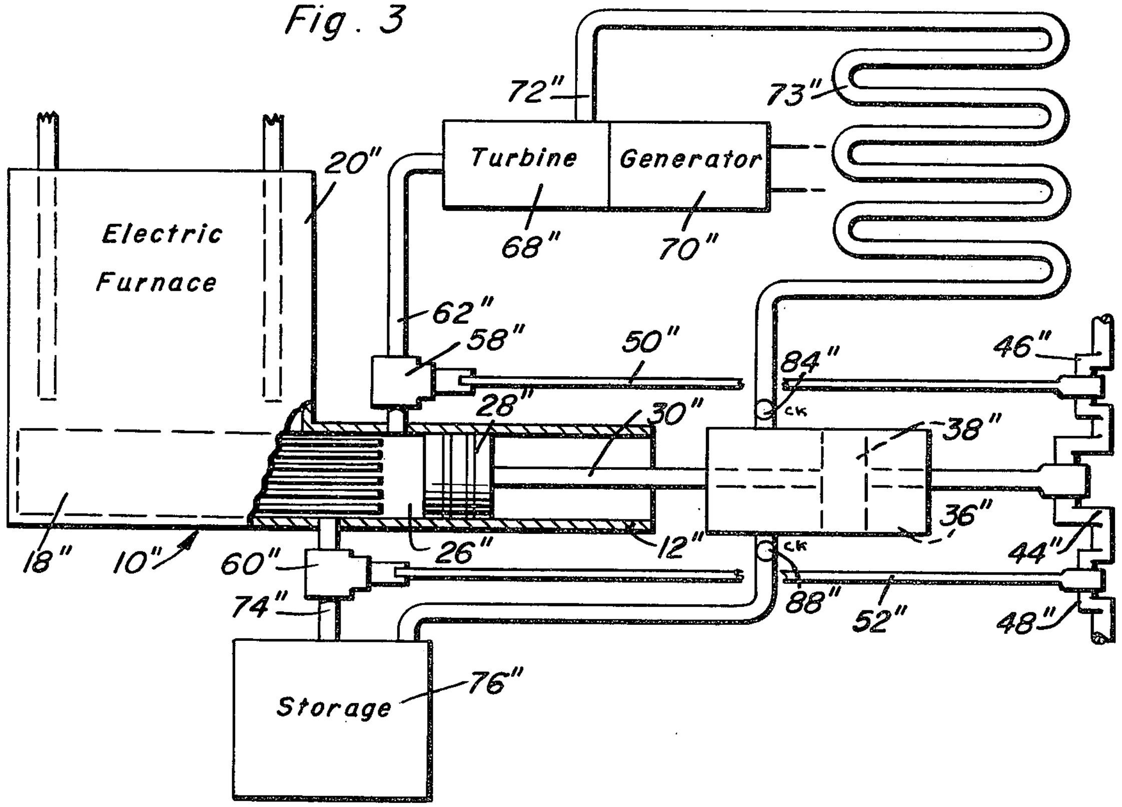

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a schematic view of a first form of the instant invention specifically designed for use as air comprising the fluid to be expanded in the expansion chamber of the engine;

FIG. 2 is a schematic view of a second form of expansion engine constructed in accordance with the present invention and adapted to utilize a liquid as the fluid to be expanded in the expansion chamber of the engine; and FIG. 3 is a schematic view of a third form of engine constructed in accordance with the present invention adapted to utilize gas as the fluid to be expanded in the expansion chamber.

Referring now more specifically to the drawings and to FIG. 1 in particular, the numeral 10 generally designates the first form of expansion engine. The engine 10 includes a cylinder 12 which is open at one end as at 14 and closed at its other end as at 16. The other end portion of the cylinder 12 comprises an expansion chamber and a heat source 18 is supported from the expansion chamber end of the cylinder 12. The heat source 18 includes an electric furnace 20 for heating any suitable dense material 22 and a plurality of heat conducting rods 24 of any suitable material extend from the dense material 22 closing the closed end of the cylinder 12 into the expansion chamber defined in the cylinder 12 as at 26 in the end thereof remote from the open end 14.

A piston 28 is reciprocal in the cylinder 12 and includes a rigid connecting rod 30 including a non-heat conducting section 32. The end of the connecting rod 30 remote from the piston 28 is slidably received through the end wall 34 of a closed ended cylinder 36 and has a second piston 38 mounted thereon slidable within the cylinder 36. The end of the piston 38 remote from the piston rod 30 has a connecting rod 40 oscillatably supported therefrom at one end and the opposite end of the connecting rod 40 is journalled on a center throw 42 of a crank shaft 44 journalled in any suitable manner (not shown). The crank shaft 44 includes opposite end throws 46 and 48 to which corresponding ends of a pair of operating rods 50 and 52 are journalled. The ends of the operating rods 50 and 52 are operatively connected to the actuator portions 54 and 56 of a pair of valves 58 and 60. The valve 58 is disposed in a pressure supply line 62 extending from an exhaust port 64 in the cylinder 12 to the inlet 66 of a turbine 68 drivingly connected to a generator 70, the turbine 68 including a discharge outlet 72 for discharging air expanded in the turbine 68 into the ambient atmosphere.

The valve 60 is serially disposed in a conduit 74 extending from an air pressure modulating tank 76 to an inlet port 78 formed in the cylinder 12 leading to the expansion chamber 26.

The end of the cylinder 36 adjacent the cylinder 12 includes an inlet line 80 provided with a check valve 84 and further includes an outlet line 86 provided with a check valve 88. The end of the cylinder 36 remote from the cylinder 12 includes an inlet line 90 provided with a check valve 92 and also an outlet line 94 provided with a check valve 96. The discharge end of the outlet line 94 opens into the air pressure modulating tank 76 and the discharge end of the line 86 may be connected to an inlet conduit or pipe of a second expansion chamber, if desired. The inlet ends of the lines 80 and 90 may be provided with any suitable air filtering means and upon reciprocation of the piston 38 air from the ambient atmosphere is drawn into the cylinder 36 and forced into the line 94 and the pressure tank 76. The valve 60 is operated in timed sequence with rotation of the crank shaft 44 and thus admits the desired quantity of pressurized air into the expansion chamber 26 in time with operation of the engine. As the air is admitted into the expansion chamber 26, it is passed in good heat transfer relation with the rods 24, heated and thus expanded to drive the piston 28 toward the open end of the cylinder 12. Then, as the piston 28 returns toward the expansion chamber 26, the rod 50 opens the valve 58 and the air expanded in the expansion chamber 26 is discharged therefrom through the conduit 62 and into the turbine 68 whereby the latter drives the generator 70. Of course, as the piston 28 is driven toward the open end 14 of the cylinder 12, air is compressed in the remote end of the cylinder 36 for delivery to the air pressure tank 76 and upon return of the piston 28 toward the expansion chamber 26 air is compressed in the end of the cylinder 36 adjacent the cylinder 12 for discharging to a second pressure tank corresponding to the pressure tank 76.

The twice expanded air discharged from the turbine 68 through the pipe or conduit 72 is discharged directly into the ambient atmosphere and it is to be understood that while the output from the generator 70 may be utilized to supply a portion of the current demand of the electric furnace 20, an outside source of electrical potential will be supplied to the electric furnace 20.

With attention now invited more specifically to FIG. 2 of the drawings, there will be seen a second form of expansion engine referred to in general by the reference numeral 10'. The engine 10' is similar to the engine 10 and the various components thereof included in the engine 10 are designated by similar prime reference numerals.

In the engine 10', the connecting rod 30' is journalled directly on the throw 42' of the crank shaft 44' and while the rod 50' actuates a valve 58', the rod 52' actuates an injector pump 53. Further, the engine 10' does not include a cylinder corresponding to the cylinder 36 or its attendant components.

Rather, the outlet 72' for the turbine 68' extends to a condenser 73 and the condenser 73 discharges into a storage tank 75 from which a gravity flow line 77 extends to the injector 53. Accordingly, the engine 10' utilizes a closed circuit and water or any other suitable liquid may be utilized as the expandable fluid. Water injected into the expansion chamber 26' is converted to steam and the steam drives the piston 28' toward the open end 14' of the cylinder 12'. The rod 50' then opens the valve 58' and the initially expanded steam is discharged into the turbine 68' for driving the generator 70'. Steam being discharged from the turbine 68' through the outlet line or conduit 72' is conveyed to the condenser 73 in which the steam is again converted to water and falls by gravity into the storage tank 75.

Referring now more specifically to FIG. 3 of the drawings, there will be seen a third form of expansion engine referred to in general by the reference numeral 10'' and which is also similar to the engine 10 and therefore has many of its various components referred to by corresponding double prime numerals.

In the engine 10'', gas of any suitable type is utilized as the expandable fluid and gas under pressure is stored in a gas pressure tank 76'' and is ducted to the expansion chamber 26'' through a conduit 74'' having a valve 60'' disposed therein actuated by a rod 52'' journalled on an end throw 48'' of a crank shaft 44''. The discharge conduit 62'' for the expansion chamber 26'' is controlled by a valve 58'' actuated by a rod 50'' journalled on a second end throw 46'' of the crank shaft 44'' and the discharge conduit 72'' for the turbine 68'' which drives the generator 70'' opens into a condenser 73'' corresponding to the condenser 73. The expanded gas is cooled in the condenser and is then pumped back to the storage tank 76'' by a compressor cylinder 36'' driven from the connecting rod 30'' of the cylinder 12''.

Accordingly, it may be seen that the engine 10'' operates in substantially the same manner as the engine 10, except that the engine 10'' utilizes a closed circuit including a condenser 73''.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A fluid expansion engine including a cylinder having a reciprocal piston therein, one end of said cylinder comprising an expansion chamber, a plurality of elongated heat exchange members including first spaced end portions thereof projecting endwise into said chamber, a heat energy source disposed exteriorly of said chamber, said heat exchange means including second spaced end portions thereof projecting endwise into and disposed in good heat transfer relation with said heat energy source exteriorly of said chamber, said heat exchange members operative to rapidly transfer heat energy absorbed by said second end portions of said heat exchange members to said first end portions of said heat exchange members, fluid supply means operatively associated with said chamber and piston for injecting fluid under pressure into said chamber in timed sequence with reciprocation of said piston and for expansion of said fluid as a result of said fluid being heated by said first end portions of said heat exchange members, and exhaust means operatively associated with said chamber for exhausting expanded fluids from said chamber in timed sequence with reciprocation of said piston, and energy conversion means operatively associated with said exhaust means operative to convert the fluids expanded in said chamber and exhausted from the latter into rotational torque.

2. The combination of claim 1 wherein said heat source comprises a highly heated body of dense material into which said spaced second end portions of said members project.

3. The combination of claim 1 wherein said energy conversion means includes a turbine having an inlet to which fluid exhausted from said chamber is ducted.

4. The combination of claim 3 including a generator, said turbine being drivingly connected to said generator.

5. The combination of claim 4 wherein said turbine includes an outlet for exhausting fluid expanded therein, said outlet opening to the ambient atmosphere.

6. The combination of claim 4 wherein said turbine includes an outlet for exhausting fluid expanded therein, a storage chamber, conduit means communicating said outlet with said storage chamber and said storage chamber with said fluid supply means, whereby a closed system for said fluid is provided.

7. The combination of claim 6 wherein said conduit means communicating said outlet with said storage chamber includes heat exchanger means serially connected therein and fluid flows from said heat exchanger to said storage chamber by gravity.

8. The combination of claim 6 wherein said conduit means communicating said outlet with said storage chamber includes heat exchanger means serially connected therein, and pump means also serially connected in said conduit means for pumping said fluid from said heat exchanger to said storage chamber.

9. The combination of claim 8 wherein said pump means is driven from said energy conversion means.

* * * * *